UNITED STATES PATENT OFFICE.

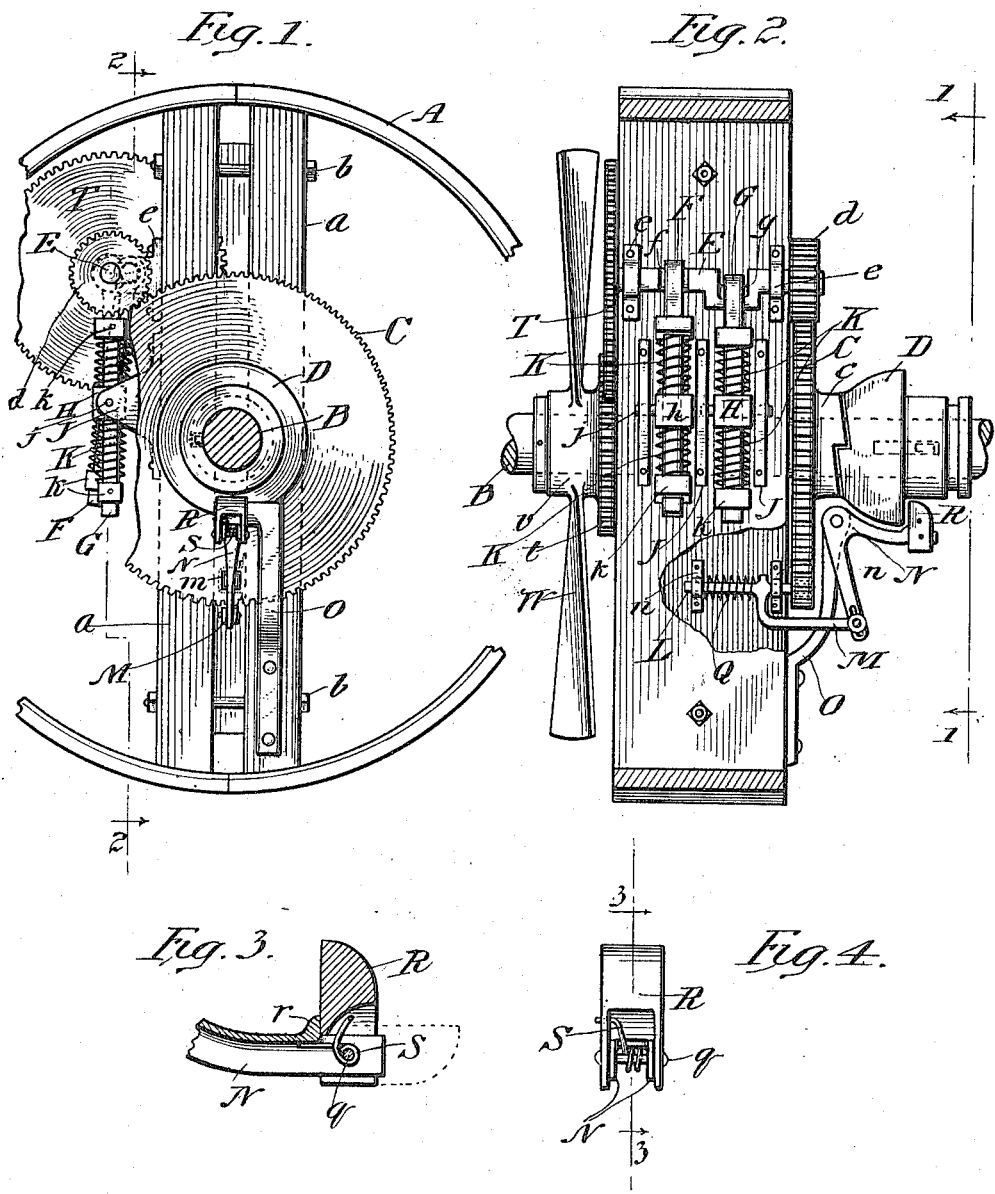

FRANK FLOEGE, OF CHICAGO, ILLINOIS.

POWER-TRANSMISSION PULLEY.

1,220,738.    Specification of Letters Patent.    Patented Mar. 27, 1917.

Application filed October 9, 1916.  Serial No. 124,501.

*To all whom it may concern:*

Be it known that I, FRANK FLOEGE, a citizen of the United States, residing at Chicago, in the county of Cook and State of Illinois, have invented new and useful Improvements in Power-Transmission Pulleys, of which the following is a full, clear, and exact description.

My invention relates to transmission devices, and particularly to power transmission pulleys.

The objects of my invention are to gradually transmit the speed of the drive-shaft to said pulley and to avoid the sudden transmission of the full speed of the drive-shaft to the pulley with the consequent strain and shock to the latter and the mechanism deriving motion from the same. This I accomplish by the means hereinafter fully explained, and as particularly pointed out in the claims.

In the drawings:

Figure 1 is a side view of a pulley with portions of its rim broken away, showing my improvements applied thereto.

Fig. 2 is a vertical transverse section taken on dotted line 2—2, Fig. 1.

Fig. 3 is a fragmentary view showing a section of a tripping device used in connection with my invention taken on dotted line 3—3, Fig. 4.

Fig. 4 is an end edge view of the same.

Referring to the drawings, A represents what is commonly known as a split pulley; that is, a pulley the rim of which is divided into two semi-circular sections, whose ends are connected by wooden chords or bars $a$, $a$, that are connected in parallel position to each other by bolts $b$, in such manner that said pulley can be loosely mounted upon a suitable drive-shaft B. Alongside of this pulley a gear C is loosely mounted upon shaft B, and the edge of the boss that projects from the side of this gear opposite the pulley is serrated to form a counterpart $c$ of a clutch D. This clutch D is splined to shaft B, as indicated by dotted lines in Fig. 2, so that it revolves with shaft B, but has a longitudinal reciprocable motion thereon to enable it to be thrown into and out of gear with said counterpart $c$.

When clutch D is thrown into engagement with its counterpart it transmits the motion of shaft B through gear C to a pinion $d$ on the end of a crank-shaft E, which latter is journaled in suitable bearings $e$, $e$, mounted upon and secured to the side of one of the bars $a$ farthest from the other bar so that its axis will be parallel to the shaft B.

Between bearings $e$, $e$, crank-shaft E is provided with two cranks $f$ and $g$ that project therefrom at right angles to each other, and each of these cranks has the adjacent ends of plungers F and G pivotally mounted thereon. Plungers F and G extend through guide-blocks $h$ and H, and these guide-blocks have trunnions $j$ projecting laterally therefrom that are journaled in bearings J, J, secured to the same side of bar $a$ to which bearings $e$ are secured. At substantially equal distances on either side of guide-blocks $h$ and H, plungers F and G have collars $k$ secured thereto, and between these collars and said blocks, said plungers have coil-springs K surrounding the same.

When motion is first transmitted to pinion $d$ and shaft E commences to turn, the motion of the latter is transmitted to pulley A through plungers F and G in intermittent impulses, and these impulses increase in rapidity as the pulley gathers momentum until said pulley revolves as fast as drive-shaft B. When the pulley is traveling nearly as fast as gear C, a transversely disposed reciprocable bolt L will automatically shoot into a recess $m$ in gear C and transmit the motion of gear C to pulley A through the medium of said bolt.

This bolt L reciprocates in suitable guides $n$, $n$, preferably secured to the side of bar $a$ opposed to the bar $a$ on which the crank-shaft is mounted, and it is provided with an integral L-shaped arm M which extends radially therefrom and then longitudinally beyond the periphery of gear C where its outer end is pivotally connected by means of a slotted connection to the adjacent end of an elbow N or bell-crank. This elbow or bell-crank N is pivoted to the end of a suitable bracket O, and the end thereof opposite arm M has the bifurcated end of a trip R pivoted thereto.

The end of the arm of bell-crank N to which trip R is pivoted is made channel-shaped, and the web connecting the parallel portions of this channel-shape is cut away back from the adjacent end of said arm back a distance corresponding to the thickness of trip R, and the foreshortened transverse edge of this connecting web is provided with an upwardly projecting lug $r$ against which said trip is made to normally bear by the pressure of a spring S that is coiled around the pivotal pin $q$ connecting the trip to the bell-crank; one end of said spring bearing against the underside of said bell-crank and the other end suitably connected to said trip, substantially as shown in Figs. 3 and 4 of the drawings.

The end portion of clutch D nearest counterpart $c$ is provided with a wider portion or head that is somewhat of a truncated cone-shape, and when this clutch is at the limit of its movement away from its counterpart, trip R will bear against the side of the head where its diameter is the greatest. When the trip is out of this position bolt L will be in engagement with the recess or opening $m$ in gear C, but when the clutch is pushed into engagement with its counterpart, trip R will snap down back of said head and bolt L will move into contact with the side of gear C and frictionally engage the same but not interlock therewith, thus permitting the rapid movement of shaft B to be transmitted to gear C, and the motion of the latter to be transmitted to the pulley through the medium of pinion $d$, the crank-shaft and the plungers, hereinbefore referred to. As hereinbefore stated, the pulley initially is given an intermittent forward motion through the medium of the plungers, but the difference in the speed of gear C and pulley A is so great that the engaging end of bolt L, which is normally kept pressing against the side of the gear by a spring Q surrounding the same between its bearings, will ride past recess $m$, and only when the motion of the pulley is about equal to the motion of gear C will said bolt automatically shoot into recess $m$, and thus cause gear C and the pulley to revolve together.

In order to provide greater resistance to the rotation of the crank-shaft and thereby cause the pulley to be pushed in the direction of the travel of gear C, I have provided the end of said crank-shaft opposite pinion $d$ with a gear T which latter engages a gear $t$ secured to the boss $v$ of a fan W. Boss $v$ is loose on shaft B and revolves faster than the crank-shaft, but owing to the resistance of the atmosphere to the vanes of the fan, the latter resists the revolutions of said crank-shaft, as hereinbefore stated. If desired, the fan and the gear therefor may be dispensed with, but I prefer the use of the same as an additional means for resisting the rotation of the crank-shaft, and thereby assisting the plungers in imparting the motion of the clutch to the pulley.

What I claim as new is:—

1. The combination with a shaft, a clutch rotatable therewith but reciprocable longitudinally thereon, and a gear loosely mounted on said shaft, the boss of which constitutes a counterpart of and is adapted to be engaged by said clutch, of a pulley, a transverse shaft carried by said pulley, a gear on the end of said shaft engaged by said first-mentioned gear, means actuated by said transverse shaft for imparting motion to said pulley, and devices which when said first-mentioned gear and said pulley are revolving at the same speed lock the same together.

2. The combination with a shaft, a clutch rotatable therewith but reciprocable longitudinally thereon, and a gear loosely mounted on said shaft, the boss of which constitutes a counterpart of and is adapted to be engaged by said clutch, of a pulley, a transverse shaft carried by said pulley, a gear on the end of said shaft engaged by said first-mentioned gear, means actuated by said transverse shaft for imparting motion to said pulley, and a transverse bolt carried by said pulley and adapted when said pulley and gear are rotating at about the same speed to engage a recess in said first-mentioned gear.

3. The combination with a shaft, a clutch rotatable therewith but reciprocable thereon, and a gear loosely mounted on said shaft, the boss of which constitutes a counterpart of and is adapted to be engaged by said clutch, of a pulley, a transverse shaft carried by said pulley, a pinion on the end of said shaft engaged by said gear, a transverse bolt carried by said pulley, and means for withdrawing said bolt from a recess in said gear when said clutch moves into engagement with its counterpart.

4. The combination with a shaft, a clutch rotatable therewith but reciprocable thereon, and a gear loosely mounted on said shaft, the boss of which constitutes a counterpart of and is adapted to be engaged by said clutch, of a pulley, a transverse shaft carried by said pulley, a pinion on the end of said shaft engaged by said gear, a transverse bolt carried by said pulley and adapted to engage a recess in said gear, an arm projecting from said bolt, a bell-crank one end of which is connected to the outer end of said arm, and a trip pivotally connected to the other end of said bell-crank.

5. The combination with a shaft, a clutch rotatable therewith but reciprocable longitudinally thereon, and a gear loosely mounted on said shaft, the boss of which constitutes a counterpart of and is adapted to be engaged by said clutch, of a pulley, a transverse crank-shaft carried by said pulley, a gear on the end of said crank-shaft engaged by said first-mentioned gear, a plunger one end of which is pivotally connected to the crank of said crank-shaft, rocking guide-bearings therefor, and springs resisting the reciprocations of said plungers.

6. The combination with a shaft, a clutch rotatable therewith but reciprocable longitudinally thereon, and a gear loosely mounted on said shaft, the boss of which constitutes a counterpart of and is adapted to be engaged by said clutch, of a pulley, a transverse crank-shaft carried by said pulley, a gear on the end of said crank-shaft engaged by said first-mentioned gear, a plunger one end of which is pivotally connected to the crank of said crank-shaft, rocking guide-bearings therefor, springs resisting the reciprocations of said plungers, and devices which when said first-mentioned gear and said pulley are revolving at the same speed lock the same together.

7. The combination with a shaft, a clutch rotatable therewith but reciprocable longitudinally thereon, and a gear loosely mounted on said shaft, the boss of which constitutes a counterpart of and is adapted to be engaged by said clutch, of a pulley, a transverse crank-shaft carried by said pulley, a gear on the end of said crank-shaft engaged by said first-mentioned gear, a plunger one end of which is pivotally connected to the crank of said crank-shaft, rocking guide-bearings therefor, springs resisting the reciprocations of said plungers, and a transverse bolt carried by said pulley and adapted when said pulley and gear are rotating at about the same speed to engage a recess in said first-mentioned gear.

8. The combination with a shaft, a clutch rotatable therewith but reciprocable longitudinally thereon, and a gear loosely mounted on said shaft the boss of which constitutes a counterpart of and is adapted to be engaged by said clutch, of a pulley, a transverse crank-shaft carried by said pulley, a gear on the end of said crank-shaft engaged by said first-mentioned gear, a plurality of plungers having their corresponding ends pivotally connected to the cranks on said crank-shafts, rocking guide-blocks in which said plungers reciprocate, and springs surrounding said plungers on both sides of said blocks.

9. The combination with a shaft, a clutch rotatable therewith but reciprocable longitudinally thereon, and a gear loosely mounted on said shaft the boss of which constitutes a counterpart of and is adapted to be engaged by said clutch, of a pulley, a transverse shaft carried by said pulley, a gear on the end of said shaft engaged by said first-mentioned gear, and a revoluble fan actuated by said transverse shaft that resists the rotation of the latter.

In witness whereof I have hereunto set my hand this 5th day of October, 1916.

FRANK FLOEGE.

Witnesses:
FRANK D. THOMASON,
F. R. MITCHELL.

Copies of this patent may be obtained for five cents each, by addressing the "Commissioner of Patents, Washington, D. C."